Feb. 17, 1970   J. J. McGEE ET AL   3,495,944
SCRUBBER METHOD AND APPARATUS
Filed June 28, 1967
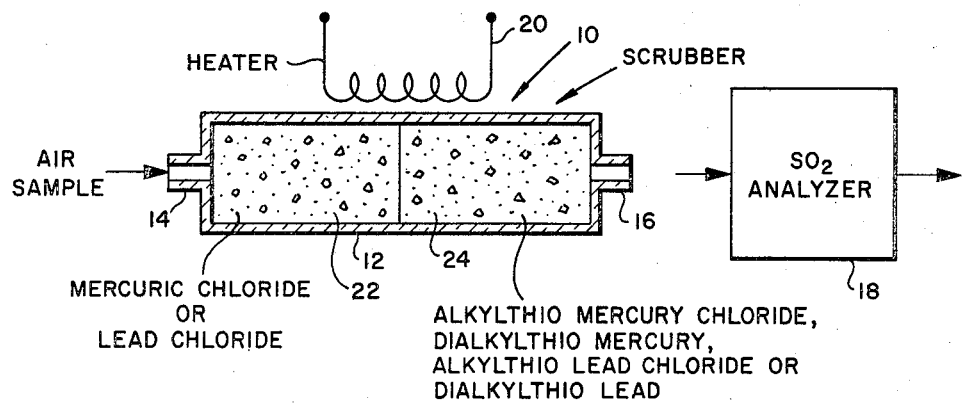
JOHN J. McGEE
TOM J. KELLY
JOHN N. HARMAN III
INVENTORS
BY
ATTORNEY

United States Patent Office 3,495,944
Patented Feb. 17, 1970

3,495,944
SCRUBBER METHOD AND APPARATUS
John J. McGee, Huntington Beach, Tom J. Kelly, Rowland Heights, and John N. Harman III, La Habra, Calif., assignors to Beckman Instruments, Inc., a corporation of California
Filed June 28, 1967, Ser. No. 649,675
Int. Cl. B01d 53/02, 53/30; G01n 29/02
U.S. Cl. 23—232
14 Claims

ABSTRACT OF THE DISCLOSURE

A solid phase chemical scrubber containing either alkylthio mercury chloride, dialkylthio mercury, alkylthio lead chloride or dialkylthio lead, or a mixture thereof, which selectively removes ozone from a sample gas stream containing $SO_2$. The scrubber is intended for use with an $SO_2$ analyzing instrument which is sensitive to both ozone and $SO_2$. The scrubber may also contain mercuric chloride or lead chloride to remove hydrogen sulfide and mercaptans from the sample gas.

---

This invention relates to an improved scrubber apparatus for removing constitutents in a gas stream which interfere with the analysis of $SO_2$ in the gas stream by an analytical instrument.

Copending patent application of Paul A. Hersch and Rudolf Deuringer entitled "Gas Analysis," Ser. No. 433,-554, filed Feb. 18, 1965, and assigned to the assignee of the present application, describes an instrument for analyzing $SO_2$ in a gas stream. The instrument generally comprises three electrodes in a cell joined by a neutral buffered halide electrolyte. The electrodes are a platinum anode, a platinum cathode and a bi-polar or reference electrode formed of active carbon. A power supply is connected to the platinum anode and the active carbon bi-polar or reference electrode to provide a coulometric generating cell for producing a constant level of free halogen in the electrolyte. The platinum cathode and the active carbon electrode provide a galvanic cell which is connected to a current measuring device. Three processes occur in the cell, namely electrolytic, chemical and galvanic, all of which are stoichiometric. In the electrolytic process, the generating current impressed across the platinum anode and the active carbon bi-polar electrode results in the production of free halogen. The second process is the chemical reaction in which the $SO_2$ in the gas stream entering the cell consumes part of the halogen produced by the electrolytic process thus leaving a residue of free halogen in the electrolyte. In the third process, the halogen residue is reduced at the platinum cathode of the galvanic cell thus entirely consuming the residue of the halogen and producing a galvanic output current. The difference between the galvanic current and the generating current is proportional to the rate at which the $SO_2$ enters the cell electrolyte and, therefore, indicative of the concentration of the $SO_2$ in the gas stream. The overall chemical reaction taking place in the $SO_2$ analyzer cell may be represented as follows:

$$SO_2 + I_2 + 2H_2O \rightarrow SO_4^= + 2I^- + 4H^+$$

As mentioned in the aforementioned Hersch et al. application, the presence in the gas sample of chemical species other than $SO_2$ which are reactive to iodine or iodide ion results in positive or negative errors in the output signal of the analyzer. The magnitude of the error signal from the interfering species is dependent upon their water solubility and reaction rates with iodine or iodide ion. Common air pollutants which interfere with the $SO_2$ analysis with the Hersch et al. cell are hydrogen sulfide, mercaptans and ozone according to the following reactions:

$$H_2S + I_2 \rightarrow 2HI + S$$
$$2RSH + I_2 \rightarrow 2HI + RSSR$$
$$O_3 + 2I^- + H_2O \rightarrow I_2 + O_2 + 2OH^-$$

What is needed, therefore, is means for reducing the error signal which is developed from each of the above interferents which may normally exist in ambient air. Ideally, a solid phase chemical scrubber is desired for removing the interferents from the sample gas so as to ensure that the interferents are permanently removed in contrast to adsorption columns in which the interferents would eventually desorb and be released to the $SO_2$ analyzer. In addition, a solid phase chemical scrubber has the advantage that the output signal and response time of the $SO_2$ analyzer are not adversely affected as in the case with liquid phase chemical scrubbers. Finally, the solid phase scrubber has the advantage that it is most practical for minimum maintenance and ease of handling in an analytical instrument.

A solid phase chemical scrubber is already known in the art for removing hydrogen sulfide and mercaptans from natural gas streams which are analyzed for $SO_2$ content. Such scrubber comprises Chromosorb, a firebrick material manufactured by Johns-Manville for use in chromatographic analyzers, which is treated with 6% by weight mercuric chloride (relative to Chromosorb) dissolved in a convenient amount of diethyl ether or methanol. In the chemical reaction occurring in such scrubber, the hydrogen sulfide in the gas stream reacts with mercuric chloride to form mercuric sulfide while the mercaptans react with the mercuric chloride to form mercuric mercaptides. Both the mercuric mercaptides and mercuric sulfide are, therefore, chemically removed permanently so as to not interfere with the analysis of the gas stream for $SO_2$. However, to our knowledge, the aforementioned scrubber utilizing mercuric chloride treated Chromosorb has not been employed for measuring $SO_2$ in ozone containing ambient air. Moreover, as will be seen later, such prior art scrubber suffers from the disadvantage that it does not efficiently remove ozone and it adsorbs $SO_2$ in the gas stream so that there is a substantial delay time between introduction of $SO_2$ in the gas stream into the scrubber and the response of the $SO_2$ analyzer. Additionally, water is adsorbed which is reacted upon by the $SO_2$. Moreover, after a period of time the $SO_2$ adsorbed in the Chromosorb support material desorbs producing an elution peak in the output current of the $SO_2$ analyzer. Thus, the prior art scrubber fails to meet the requirements necessary for efficient and long capacity scrubbing of interferents in ambient air which is being analyzed for very low levels of $SO_2$.

It is, therefore, the principal object of the present invention to provide improved means for selectively removing ozone from a gas stream containing $SO_2$.

According to the principal aspect of the present invention, a solid phase chemical scrubber is provided containing either alkylthio mercury chloride, dialkylthio mercury, alkylthio lead chloride or dialkylthio lead, or a mixture thereof. When a gas stream such as ambient air containing ozone and $SO_2$ is passed through the scrubber prior to delivery to an $SO_2$ analyzer, the ozone in the gas stream chemically reacts with the above mentioned substances to produce a sulfonic acid derivative. By adding mercuric or lead chloride to the scrubber, mercaptans and hydrogen sulfide in the gas stream are chemically removed together with the ozone. However, in contrast to the aforementioned prior art scrubber, no adsorption material is employed in the scrubber of the invention which physically adsorbs $SO_2$ resulting in the undesired characteristics described previously.

Other objects, aspects and advantages will become apparent from the following description taken in connection with the accompanying drawing in which there is iillustrated a schematic representation of an $SO_2$ analyzer employing the scrubber apparatus of the present invention.

Referring now to the drawing in detail, there is shown a scrubber, generally designated by numeral 10, which comprises a glass container 12 having an inlet port 14 and an outlet port 16. The outlet port 16 is connected to an $SO_2$ analyzer 18 of the type described in the aforementioned Hersch et al. application. A heater 20 is positioned adjacent to the scrubber to optimize efficiency. The air sample enters through the port 14 and passes through a packing material in the scrubber. The effluent from the scrubber is conveyed from the outlet port 16 to the $SO_2$ analyzer 18.

In accordance with the invention, the container 12 holds two solid phase chemical scrubbing materials 22 and 24. The scrubbing material 22 consists of granules of mercuric chloride or lead chloride, or a mixture thereof, or a support material which is nonchemically reactive and non-adsorbing to the constituents in the gas stream and coated with mercuric chloride or lead chloride. A suitable supporting material having the desired characteristics of being nonchemically reactive and non-adsorbing to gaseous constituents in a gas stream is powdered polyhalogenated hydrocarbon polymers such as Teflon, a product of E. I. du Pont de Nemours and Co. The powdered Teflon is coated with mercuric chloride or lead chloride by dissolving 6% by weight relative to support material weight of one of the salts in a solvent and mixing such solution with Teflon powder. Suitable solvents are methanol, diethyl ether or water. The Teflon powder-solvent mixture is then heated in an oven or left open at room temperature for extended periods of time to evaporate the solvent, thus leaving dry granules of Teflon covered with mercuric chloride or lead chloride. The material thus formed has the advantage over that described in the prior art employing Chromosorb as the support material in that it does not physically adsorb $SO_2$ or water vapor in the gas stream yet efficiently chemically removes mercaptans and hydrogen sulfide by forming hydrogen sulfide and mercuric mercaptides.

Further, in accordance with the invention, the scrubbing material 24 is preferably formed of the same material as the material 22 but treated with a suitable mercaptan to provide a coating of alkylthio mercury chloride and/or dialkylthio mercury when mercuric chloride is employed in the first instance in treating the Teflon support material or alkylthio lead chloride and/or dialkylthio lead when lead chloride is used. The treating of the mercuric chloride or lead chloride coated Teflon powder with a mercaptan is accomplished by flowing an inert gas stream such as nitrogen containing a mercaptan such as ethyl mercaptan through the coated Teflon granules for sufficient time and at a sufficient flow rate until the mercuric chloride or lead chloride coating on the support material is chemically converted to ethylthio mercury chloride and/or diethylthio mercury or ethylthio lead chloride and/or diethylthio lead, respectively. It is an important feature of the invention that during this mercaptan treating step the granules be wetted with a solvent in which mercuric and lead chloride and the mercaptans are soluble, such as methanol, diethyl ether or water. Without so wetting the granules during the mercaptan treating step, the capacity of the scrubber to remove ozone is reduced about ten-fold. After this treatment the granules are dried in the manner described previously. It has been found that a material formed in accordance with the above method chemically removes ozone from the gas stream by forming a sulfonic acid derivative, yet does not adsorb or otherwise affect $SO_2$ in the sample gas. The two scrubber materials 22 and 24 may be packed separately in the container 12 as shown in the drawing or may be mixed together if desired.

While in the aforementioned method wherein alkylthio mercury chloride and/or dialkllthio mercury and alkylthio lead chloride and/or dialkylthio lead are synthesized by treating mercuric or lead chloride coated Teflon with a mercaptan, it is understood that the invention also contemplates the use of granules of pure alkylthio mercury chloride, dialkylthio mercury, alkylthio lead chloride or dialkylthio lead, or mixtures thereof, or granules of pure mercuric chloride or lead chloride which have been treated with a mercaptan to provide a surface coating of the above-mentioned substances. In addition, the advantages of the present invention achieved by employing a support material which does not adversely affect the $SO_2$ being analyzed may be achieved by use of other support materials that are nonchemically reactive and non-adsorbing to gases as, for example, minute glass beads. However, the powdered polymer such as Teflon has the advantage that it has a very high surface area for contact with the gas sample.

While ethyl mercaptan is the preferred gas for treating the mercuric chloride or lead chloride coated Teflon granules, it is understood that other members of the homologous series such as methyl and propyl mercaptans would be expected to function equally as well although it is expected that the higher members of the homologous series which contain a longer carbon chain may not provide as an efficient scrubber for ozone.

It has been found that the scrubber materials 22 and 24 do not adsorb $SO_2$ in the gas stream under normal conditions of operation of the $SO_2$ analyzer and scrubber. Under such normal operating conditions, the temperature of the environment surrounding the scrubber is generally about 40° C. If the operating temperature is not at this level, it is desirable to provide a heater 20 to ensure that the temperature of the materials in the scrubber 10 as at least 40° C. so that no water in the gas stream will be adsorbed on the scrubber material as might occur in humid atmospheres. If water does collect in the scrubber, $SO_2$ in the gas stream will be hydrolyzed and, therefore, removed from the gas stream, thereby causing the sample which is desired to be measured to be lost.

The scrubber apparatus of the present invention has a high efficiency and capacity. Scrubbing efficiency is dependent upon the ability of the scrubber to remove the interfering constituents in a gas stream such as hydrogen sulfide, mercaptans and ozone in air. For example, 99% scrubbing efficiency means that when a test gas containing 100 p.p.m. interferents is passed through the scrubber only 1 p.p.m. is seen at the output of the scrubber as sensed by the $SO_2$ analyzer. The capacity of a scrubber is the numerical product of parts per million of the interfering gas that is removed and time. The capacity therefore provides a measure of the length of time that a scrubber may be employed at known levels of interferents in a gas stream.

The advantages of the present invention can be best appreciated by considering the following specific examples of tests with various scrubbers as compared with the preferred embodiment of the scrubber of the present invention described in Example X.

EXAMPLE I

The scrubber 10 was packed with Chromosorb P45/60. A stream of ambient air containing 2 p.p.m. ozone was passed through the scruber at 150 cc./minute. No ozone was detected by the $SO_2$ analyzer 18 within 24 hours. This was due to the physical adsorption of the ozone on the Chromosorb. Thus, Chromosorb is inadequate for permanently removing ozone from a gas stream.

EXAMPLE II

The scrubber 10 was filled with 25 grams of reagent grade mercuric chloride. A nitrogen gas stream containing 2 p.p.m. $SO_2$ was passed through the scrubber at 150 cc./minute. The $SO_2$ analyzer 18 did not reach 90% of full scale reading until about 12–15 minutes after the $SO_2$ entered the scrubber, which is on the order of 4 times greater than the normal response of the analyzer to $SO_2$ in a gas stream when no scrubber was employed. Thus, the response of the system was too slow for practical $SO_2$ analysis.

EXAMPLE III

The scrubber 10 was filled with 25 grams of reagent grade mercuric chloride. An air stream containing 2 p.p.m. ozone was passed at a rate of 150 cc./minute through the scrubber at 70° C. No change of the output signal of the $SO_2$ analyzer 18 was noted for 4 hours thus indicating that the scrubber was effectively removing ozone for that period of time. However, the output of the analyzer indicated that the effluent from the scrubber contained 2 p.p.m. ozone after 11 hours of operation. Thus, this scrubber exhibited a capacity of 22 p.p.m./hours which is inadequate for practical usage. The ability of the mercuric chloride to remove ozone in this test is believed to be due to the large surface area of the mercuric chloride serving to adsorb ozone in a similar fashion to Chromosorb.

EXAMPLE IV

The scrubber 10 was filled with mercuric chloride coated Chromosorb. This material was produced by mixing 6% by weight of mercuric chloride dissolved in diethyl ether with Chromosorb P45/60 and heating to evaporate the ether thereby providing dry mercuric chloride coated Chromosorb granules. A nitrogen gas stream containing 2 p.p.m. $SO_2$ was passed at 150 cc./minute through the scrubber and no response to $SO_2$ was noted after 3 minutes. The $SO_2$ analyzer was determined to be operational by by-passing the scrubber. Thus, the mercuric chloride coated Chromosorb adsorbed $SO_2$ in the sample gas.

EXAMPLE V

The scrubber described in Example IV above was heated for 1 hour at 60° C. After cooling, the scrubber was connected to the $SO_2$ analyzer and to the nitrogen gas sample containing 2 p.p.m. $SO_2$. The delay time between introducing the gas stream into the scrubber and changing of the output of the $SO_2$ analyzer was less than 3 minutes thus indicating that the drying of the Chromosorb by heating the scrubber prior to connection to the $SO_2$ analyzer served to decrease the adsorption of the $SO_2$ in the scrubber material, or to remove water bound on the Chromosorb which can react causing loss of $SO_2$ by hydrolysis.

EXAMPLE VI

A test as described in Example IV was again conducted. The $SO_2$ analyzer reached 90% full scale response within 10 minutes as compared to 90% full scale response of the analyzer being reached within 3 minutes without the use of the scrubber. After the $SO_2$ sample was removed from the scrubber after the analyzer had reached a maximum readout for the concentration of $SO_2$ in the gas stream, an elution peak was noted resulting in the meter of the $SO_2$ analyzer driving off-scale and then returning to a normal zero position. This elution peak was attributed to the desorption of adsorbed $SO_2$ on the Chromosorb support material and was found to have a magnitude which was proportional to the humidity of the ambient gas which was used as the zero sample.

EXAMPLE VII

A test was conducted as described in Example IV except that the scrubber was heated to 70° C. during the test period to lessen the humidity and therefore the loss of $SO_2$ on the Chromosorb support material. The analyzer reached 78% full scale response within 6 minutes. When an air sample stream containing 1 p.p.m. ozone was passed through the system, no ozone transmission through the scrubber was noted for 120 minutes. In addition, no transmission of ethyl mercaptan was noted for 15 minutes when a 100 p.p.m. ethyl mercaptan in nitrogen gas stream was passed through the scrubber. These results indicate that the scrubber physically removed ozone and ethyl mercaptan, as well as $SO_2$, for a period of time due to adsorption on the Chromosorb support material.

EXAMPLE VIII

A scrubber was packed with 2.5 grams of 6% mercuric chloride on Chromosorb as described in Example IV and 2.5 grams of the diethylthio mercury coated Chromosorb. The latter was formed by passing a nitrogen gas stream containing 10,000 p.p.m. ethyl mercaptan through mercuric chloride coated Chromosorb to provide a coating of diethylthio mercury on the Chromosorb. A nitrogen gas stream containing 100 p.p.m. ethyl mercaptan was passed through the scrubber at 150 cc./minute. The output of the $SO_2$ analyzer indicated a scrubber efficiency of 99.7% with respect to ethyl mercaptan and a capacity of 150 hours for the 100 p.p.m. ethyl mercaptan. The scrubber was not exhausted in terms of scrubber capacity with the total exposure of 150 p.p.m.-hours on 100 p.p.m. hydrogen sulfide in nitrogen in addition to the 150 p.p.m.-hours of 100 p.p.m. ethyl mercaptan in nitrogen. Thus, the scrubber has a total capacity of greater than 300 p.p.m.-hours the hydrogen sulfide and mercaptan. Although the scrubber displayed adequate scrubbing characteristics for the ethyl mercaptan and hydrogen sulfide, the Chromosorb support material adsorbed $SO_2$ and elution peaks were produced when the $SO_2$ concentration of the sample gas was reduced. Some ozone scrubbing was noted with this scrubber due, undoubtedly, to adsorption on the Chromosorb support material.

EXAMPLE IX

A scrubber was packed with Teflon T6 powder, a product of E. I. du Pont de Nemours and Co., which was coated with 6% mercuric chloride in a manner described previously. No delay or elution peaking characteristics was noted with this scrubber, as in the scrubber employing the Chromosorb support material, when a nitrogen gas stream containing 2 p.p.m. $SO_2$ was passed through the scrubber. Even after 2 months from the time of preparation of the Teflon coated mercuric chloride, the $SO_2$ analyzer reached 90% full scale response in less than 3 minutes. When a nitrogen gas stream containing 2 p.p.m. $SO_2$ was passed through the scrubber, there was no visible indication between time of exposure of test sample to the input of the scrubber and response of the analyzer. The scrubber had 150 p.p.m.-hour capacity for 100 p.p.m. ethyl mercaptan in nitrogen and greater than 120 p.p.m.-hour capacity for 100 p.p.m. hydrogen sulfide in nitrogen. That is, the scrubber had a capacity to combined organic sulfide and inorganic sulfide of 270 p.p.m.-hours. The efficiency of the scrubber with respect to the mercaptan and hydrogen sulfide was greater than 99%. However, this scrubber showed an undefinable efficiency for the removal of ozone. When 3 p.p.m. of ozone in air was passed through the scrubber, no ozone transmission was noted for 4 hours; then the ozone stepped to a constant 70% transmission level through a transition phase of ozone transmission.

EXAMPLE X

The scrubber 10 was packed with 3.1 grams of 6% mercuric chloride on powdered Teflon T6 as described in Example IX above and 3.1 grams of ethylthio mercury chloride-diethylthio mercury coated Teflon. The latter was formed by passing 10,000 p.p.m. ethyl mercaptan in nitrogen for one-half hour at 150 cc./minute through mercuric chloride coated Teflon powder wetted with methanol. At an environmental temperature of 45° C., the scrubber had greater than 300 p.p.m.-hours capacity for 100 p.p.m. hydrogen sulfide in nitrogen and 100 p.p.m. ethyl mercaptan in nitrogen and greater than 150 p.p.m.-hours capacity for 3 to 4 p.p.m. ozone in nitrogen. With the scrubber heated to 65° C., the scrubber had greater than 200 p.p.m.-hours capacity for 4 p.p.m. ozone in nitrogen with greater than 95% efficiency for removal of the ozone. Response checks were taken to 2 p.p.m. $SO_2$ by by-passing the scrubber and by running the test $SO_2$ sample through the scrubber. No deleterious effects on instrumental response time to the $SO_2$ sample were noted when the sample was passed through the scrubber, and no elution peaks due to adsorption of $SO_2$ on the Teflon support material were noted as would have been noted if Chromosorb had been used as the support material. Performance on high ambient humidity background gas was observed by passing ambient air presaturated with water vapor at room temperature through the above-mentioned scrubber for 24 hours. No significant loss of signal amplitude or increase in the time constant of the signal response of the $SO_2$ analyzer was noted.

While in the normal testing of $SO_2$ in the atmosphere, it is desirable to remove mercaptans and hydrogen sulfide as well as ozone by a scrubber as described in Example X, it is understood that the scrubber material 22 could be eliminated if it is desired only to remove ozone from a gas stream.

What is claimed is:

1. A scrubber apparatus for selectively removing ozone from a gas stream containing $SO_2$, said apparatus including a container having an inlet port and an outlet port adapted to be connected to an $SO_2$ analyzer which is sensitive to ozone as well as $SO_2$, wherein the improvement comprises:
    granules in said container, said granules being selected from the group consisting of (a) granules of a material; (b) granules of a component nonchemically reactive and nonadsorbing to gaseous constituents in the gas stream and coated with said material and (c) granules of a salted coated with said material, said salt being selected from the group consisting of mercuric chloride and lead chloride; and
    said material being at least one substance selected from the group consisting of alkylthio mercury chloride, dialkylthio mercury, alkylthio lead chloride and dialkylthio lead.

2. An apparatus as set forth in claim 1 wherein said component is a polyhalogenated hydrocarbon polymer.

3. An apparatus as set forth in claim 2 wherein said polymer is Teflon.

4. An apparatus as set forth in claim 1 wherein the alkyl of said substances is the ethyl group.

5. An apparatus as set forth in claim 1 including, in addition to said first mentioned granules, second granules in said container, said second granules being selected from the group consisting of granules of a second material and granules of a component nonchemically reactive and nonadsorbing to constituents in the gas stream and coated with said second material; and
    said second material being selected from the group consisting of mercuric chloride and lead chloride.

6. An apparatus as set forth in claim 1 wherein said granules are powdered Teflon coated with at least one substance selected from the group consisting of ethylthio mercury chloride and diethylthio mercury.

7. An apparatus as set forth in claim 6 including, in addition to said first mentioned granules, second granules in said container; and
    said second granules being powdered Teflon coated with mercuric chloride.

8. An apparatus as set forth in claim 1 including heating means to heat said container.

9. A process of preparing a solid phase scrubber material for selectively removing ozone from a gas stream containing $SO_2$ comprising:
    contacting granules of a polyhalogenated hydrocarbon polymer with a solvent containing a dissolved salt selected from the group consisting of mercuric chloride and lead chloride;
    passing a stream of gas containing a mercaptan over said granules while wetted with solvent; and
    drying said granules.

10. A process as set forth in claim 9 wherein said granules are powdered Teflon, said salt is mercuric chloride and said gas stream is an inert gas containing ethyl mercaptan.

11. A method of analyzing $SO_2$ in a gas stream containing $SO_2$ and ozone with an analyzer that is sensitive to both $SO_2$ and ozone comprising passing the gas stream through an ozone scrubber and conveying the gas effluent from said scrubber to said analyzer wherein the improvement comprises:
    providing granules in said scrubber, said granules being selected from the group consisting of (a) granules of a material, (b) granules of a component nonchemically reactive and nonadsorbing to gaseous constituents in the gas stream and coated with said material and (c) granules of a salt coated with said material, said salt being mercuric chloride or lead chloride; and
    said material being one or more substances selected from the group consisting of alkylthio mercury chloride, dialkylthio mercury, alkylthio lead chloride and dialkylthio lead.

12. A method as set forth in claim 11 including providing in said scrubber, in addition to said first-mentioned granules, second granules, said second granules being selected from the group consisting of granules of a second material and granules of a component nonchemically reactive and nonadsorbing to constituents in the gas stream and coated with said second material; and
    said second material being selected from the group consisting of mercuric chloride and lead chloride.

13. A method as set forth in claim 12 wherein said first-mentioned granules are powdered Teflon coated with at least one substance selected from the group consisting of ethylthio mercury chloride and diethylthio mercury; and
    said second granules being powdered Teflon coated with mercuric chloride.

14. A method as set forth in claim 11 including the additional step of heating said scrubber to at least 40° C.

References Cited

UNITED STATES PATENTS 3,433,580  3/1969  Deuringer _____ 23—2.1

FOREIGN PATENTS 1,436,673  12/1965  France.

JOSEPH SCOVRONEK, Primary Examiner

R. M. REESE, Assistant Examiner

U.S. Cl. X.R.

23—2, 222, 284; 117—100; 260—431, 435